3,297,663
VINYLPHOSPHONIC ACID POLYMERS AND PROCESS FOR MAKING THEM
Willy Herbst, Hofheim, Taunus, Germany, Fritz Walter Artur Rochlitz, deceased, late of Bad Soden, Taunus, Germany, by Franz Rochlitz and Anneliese Rochlitz, née Paetsch, both of Stuttgart-Degerloch, Germany, heir and heiress, and Herbert Vilcsek, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Oct. 22, 1964, Ser. No. 405,870
Claims priority, application Germany, Nov. 11, 1959,
F 29,824
7 Claims. (Cl. 260—80)

This application is a continuation-in-part of application Ser. No. 67,915, filed November 8, 1960, and now abandoned.

The present invention relates to vinylphosphonic acid polymers and to a process for making them.

It is known that liquid or solid polymers can be obtained by polymerizing vinylphosphonic acid dichloride (German Patent 1,032,537). It is also known that vinylphosphonic acid esters alone are difficult to polymerize and if they are polymerized yield products of very low molecular weight (Pudovik, Doklady. Akad. Nauk. 80, 65–68 (1951)), but no process has so far been described for polymerizing vinylphosphonic acid alone.

We have now found that vinylphosphonic acid can be polymerized to yield very viscous or solid polyvinylphosphonic acid having novel and valuable properties. The preparation of vinylphosphonic acid is described in German Patent 1,023,033, published January 23, 1958.

The polymerization is advantageously carried out by heating and/or under the catalytic action of ultraviolet light and/or by adding a free radical-liberating type of initiator. The polymerization according to this invention can be carried out at temperatures within the range of between $-10°$ C. and $+300°$ C. Still higher temperatures can be used when the polymerization is carried out, for example, in vacuo or in the atmosphere of an inert gas, and still lower temperatures can be used when the polymerization is carried out using an appropriate system of initiators and a solvent. When the polymerization is carried out with the use of a free radical-liberating type of initiator and/or with irradiation of ultraviolet light, it is advantageous to use a temperature within the range of $+5°$ C.–$130°$ C. In some cases especially when vinylphosphonic acid is polymerized predominantly by thermal means, it is advantageous to work at a temperature above $175°$ C.

As free radical-liberating type of initiator there may be used more especially compounds which are soluble in vinylphosphonic acid alone or in organic solvents or water, or in mixtures of the aforesaid substances, for example peroxides, such as benzoyl peroxide, toluyl peroxide, di-tert.-butyl peroxide, chlorobenzoyl peroxide, or hydroperoxides, for example methylethylketone peroxide, tert.-butylhydroperoxide, cumene hydroperoxide or hydrogen peroxide; or alkali metal persulfates, for example, potassium persulfate, alkali metal carbonates, for example sodium percarbonate or potassium percarbonate; or azodiisobutyronitrile, sulfinic acids, such as p-methoxyphenyl-sulfinic acid, isoamyl-sulfinic acid, benzene-sulfinic acid; or, if desired, combinations of various of such catalysts or combinations with formaldehyde sodium sulfoxylate or alkali metal sulfites.

Heavy metal compounds, such as cobalt naphthenate, copper acetylacetonate, can also be used, advantageously in dissolved form as agents accelerating polymerization.

The free radical-liberating type of initiator is generally used in a proportion of between about 0.01% and 10%, preferably 0.1% and 6%, calculated on the weight of the monomer. The polymerization can be carried out as bulk or solution polymerization.

We have furthermore found that phosphorus-containing monomers such as vinylphosphonic acid and its monoammonium salt, monoamine salts and monoalkali metal salts, as well as mixtures of these monomers with one another or with other monomers that are copolymerizable with the said monomers, can be polymerized in very short reaction times which are of interest in industry and with very good yields to obtain powdery solid linear polymers, by carrying out the polymerization in an appropriate unpolymerizable organic liquid solvent in which all monomers used are soluble but in which the polymers are insoluble and hence precipitate at the rate in which they are formed. This polymerization process is designated hereinafter and in the claims as a "precipitation polymerization process." The mixture in which the precipitation polymerization is carried out contains at least 20%, preferably 30–95%, calculated on the weight of the total mixture, of the unpolymerizable organic liquid. Whereas the methods which have been described in the literature for polymerizing the vinylphosphonic acid double bond of low polymerization reactivity always take much time and in many cases only yield mixtures containing a high proportion of monomer or monomers together with a small amount of polymer, which mixtures require purification by processes which are often time-consuming and energy-consuming, the precipitation polymerization process in accordance with the invention enables polymers of vinylphosphonic acid and its monoammonium salts and monoalkali metal salts to be obtained in excellent yields already within a few hours. Further, the polymers are in a filterable form and contain no monomer portion. By copolymerizing vinylphosphonic acid or the salts thereof using the precipitation polymerization process of the invention, copolymers having a high phosphorus content are obtained in good yields.

If vinylphosphonic acid is copolymerized by known processes with 0.01–50%, calculated on the total weight of the monomers, of other compounds containing polymerizable double bonds, a decrease in the speed of polymerization, of the yield and the molecular weight of the polymers is observed, owing to the presence of the vinylphosphonic acid. In many cases only a slight amount of phosphorus is incorporated into the copolymers by the copolymerization and the copolymers are chiefly a polymer of the comonomer. If, however, the copolymerization of vinylphosphonic acid with other polymerizable monomers is carried out in an appropriate unpolymerizable organic liquid solvent which is a solvent for the monomers and a non-solvent for the polymer, that is if the precipitation polymerization process of the invention is applied, the polymerization speed of the vinylphosphonic acid is increased and the difference between the polymerization speed of the vinylphosphonic acid and the comonomers is less, so that copolymers having a very high phosphorus content are obtained within a short time.

Unpolymerizable organic liquids suitable for use in the process of the invention are those which contain heteroatoms which are suitable as weak electron donors for the formation of H-bridges with the vinylphosphonic acid. Such solvents are straight chain or branched aliphatic, arylaliphatic or cycloaliphatic alcohols with up to 16 carbon atoms, their ethers and mixed ethers, also with phenols, the esters of the said alcohols with straight chain or branched aliphatic, arylaliphatic, cycloaliphatic or aromatic mono- or polycarboxylic acids with up to 12 carbon atoms, said acids, their anhydrides and mixed anhydrides, their amides and nitriles, symmetrical or unsymmetrical mono- or polyketones, the hydrocarbon radicals of which may be alkyl, aryl, aralkyl and cycloalkyl. It is within the scope of the invention to use also unpolymerizable organic liquids that contain several of the functional groups of the aforesaid compounds. The polymerization and copolymerization of vinylphosphonic acid is advantageously carried out in ethylacetate, butylacetate, propylbutyrate, acetic acid, formic acid, acetic anhydride; the polymerization of the monoammonium-salts and monoalkali metal salts of vinylphosphonic acid is advantageously performed in ethanol or methanol. It is also possible to use mixtures of the aforesaid unpolymerizable organic liquids with one another or with other unpolymerizable organic liquids if the proportion of the latter does not exceed 60% of the total amount of the mixture of the unpolymerizable organic liquids.

The precipitation polymerization process of the invention is advantageously carried out under the action of free radical polymerization catalysts or/and under the action of ultraviolet light and other rays rich in energy at a temperature within the range of $+10°$ C. to $+150°$ C., advantageously $+50°$ C. to $+100°$ C. Higher temperatures may, for example, be reached if the polymerization is carried out under pressure.

As free radical polymerization catalysts there are advantageously used those which are soluble in the above mentioned unpolymerizable organic liquids. Examples of such compounds are the above peroxides such as benzoyl peroxide, toluyl peroxide, di-tert.butyl peroxide, chlorobenzoyl peroxide, or hydroperoxides such as methylethylketone peroxide, tert. butyl hydroperoxide, cumene hydroperoxide, hydrogen superoxide, or azo-bis-iso-butyronitrile, or sulfinic acids such as p-methoxyphenyl-sulfinic acid, isoamyl-sulfinic acid, benzene-sulfinic acid, or combinations of various of such catalysts with one another and/or combinations for example, with formaldehyde sodium sulfoxylate or with alkali metal sulfites.

In the precipitation polymerization process of the invention, the free radical polymerization catalysts may be added in an amount of 0.005 to 10%, advantageously 0.1 to 6%, calculated on the weight of the monomers.

It is within the scope of the invention to replace vinylphosphonic acid or its salts to an extent of up to 50% by other compounds with polymerizable double bonds. Such co-monomers are, for example, styrene divinylbenzene, butadiene, isoprene, ethylene, propylene, vinyl chloride, vinylidene chloride, vinylpyrrolidone, vinylpyridine, esters of vinyl alcohol with saturated or unsaturated monocarbocylic acids with 1 to 18 carbon atoms, ethers of allyl alcohol, acrylic acid and methacrylic acid and their salts, esters, amides, Schiff bases, N-methylol derivatives and nitriles, maleic anhydride and itaconic anhydride, vinylsulfonic acid and its esters and amides, and esters and amides of vinylphosphonic acid. It is advantageous first to place the phosphorus-containing monomer and the unpolymerizable organic liquid in the reaction vessel, and then to add gradually the comonomer and the free radical polymerization catalyst, which may be dissolved in the comonomer.

In many cases the polymers are obtained by the precipitation polymerization process of the invention in a quantitative yield, and in most cases in a yield above 80%. The polymers constitute white powders which can be easily filtered and are quite soluble in water. They need not be further purified since their monomer content is generally below 0.5%. The polymers are valuable plastics which may be used, for example, for the manufacture of shaped articles. They may also be used, for example, for improving other plastics or for flame-proofing other polymers.

The following examples serve to illustrate the invention but they are not intended to limit it thereto, the parts being by weight unless otherwise stated:

*Example 1*

150 parts vinylphosphonic acid were heated for 6 hours at 210° C. under a pressure of 2 mm. of mercury in a vessel provided with a reflux condenser. Without noteworthy discoloration of the initially slightly yellowish monomeric vinylphosphonic acid, which was relatively thinly liquid in the molten state, a polymer was obtained which after cooling solidified to a solid, slightly tacky mass. The polyvinylphosphonic acid so produced was well soluble in water and alcohols, for example isopropanol and glycerol.

*Example 2*

In a vessel provided with a reflux condenser, 100 parts vinylphosphonic acid and 1 part methylethylketone peroxide were exposed for several days to the action of intense sun light. The whole polymerized into a very viscous mass.

*Example 3*

In a vessel provided with a reflux condenser, 150 parts vinylphosphonic acid were dissolved in 150 parts isopropanol and heated for 5 hours at 85–90° C. together with 0.75 part benzoyl peroxide. A very viscous clear solution of polyvinylphosphonic acid was obtained.

*Example 4*

In a vessel provided with a reflux condenser, 200 parts vinylphosphonic acid were dissolved in 100 parts water and polymerized for 6 hours at 90° C. together with 1 part potassium persulfate. A thickly liquid, substantially colorless solution of polyvinylphosphonic acid was obtained.

*Example 5*

In a vessel provided with a reflux condenser, 130 parts of the monosodium salt of vinylphosphonic acid were dissolved in 130 parts water and polymerized for 5 hours at 85° C. together with 0.65 part potassium persulfate. A viscous colorless solution was obtained.

*Example 6*

In a vessel provided with a reflux condenser, 250 parts vinylphosphonic acid were heated for 7 hours at 75–80° C. under nitrogen together with 1 part methylethylketone peroxide. The batch darkened slightly and solid polyvinylphosphonic acid was obtained.

*Example 7*

In a round flask provided with a reflux condenser, 54 parts vinylphosphonic acid were dissolved in 130 parts ethylacetate, 0.81 part benzoyl peroxide was added and the whole was kept for 4 hours on the water bath at a temperature of 80–95° C. A colorless powder was obtained. It was filtered off, after-washed with ethylacetate and dried in the drying cabinet. The polyvinylphosphonic acid so produced was obtained in a yield of 83% by weight and had a K-value of 26.8.

*Example 8*

A solution containing 50 parts vinylphosphonic acid, 50 parts ethylacetate and 0.75 part benzoyl peroxide was allowed to flow within 90 minutes into a round flask provided with a reflux condenser and containing 120 parts ethylacetate, the whole being heated at 85–90° C. After all had been dropped in, heating was continued for a further 2 hours at that temperature, the precipitated white polyvinylphosphonic acid was filtered off and after-washed with ethylacetate.

*Example 9*

100 grams vinylphosphonic acid in 200 cc. ethylacetate were placed in a four-necked flask provided with a stirrer, thermometer, dropping funnel and inlet pipe for nitrogen. A mixture of 1 gram azo-bis-isobutyronitrile in 50 cc. ethylacetate was added drop by drop within 1 hour, while stirring, heating under reflux and introducing nitrogen. The batch was then kept at reflux temperature for a further 3 hours, while stirring. The polymer precipitated in the form of a white powder gradually as the polymerization proceeded. When the polymerization was terminated, the batch was allowed to cool and the polymer which had precipitated was suction-filtered and dried at 80–100° C. 90 grams of a white hygroscopic powder were obtained. By elementary analysis of the polymer the following values were obtained (double determination):

C, 23.8%, 23.5%; H, 5.1%, 4.9%; P, 26.0%, 26.3%.

*Example 10*

100 grams vinylphosphonic acid in 200 cc. glacial acetic acid were placed in the apparatus described in Example 9 and polymerized at 80° C. in a manner analogous to that described in Example 9 by adding 0.5 gram azo-bis-isobutyronitrile in 50 cc. glacial acetic acid. The polymer was obtained in a yield of 90 grams. By elementary analysis of the polymer the following values were obtained (double determination):

C, 26.8%, 26.9%; H, 5.3%, 5.2%; P, 22.4%, 22.5%.

*Example 11*

100 grams vinylphosphonic acid in 200 cc. acetic anhydride were placed in the apparatus of Example 9, and 1 gram benzoyl peroxide in 50 cc. acetic anhydride was added at 80° C. within 30 minutes in a manner analogous to that described in Example 9 while stirring. The polymerization took a particularly rapid course. The polymer which had precipitated was isolated and dried in a vacuum drier. 95 grams of a white powdery polymer were obtained. By elementary analysis of the polymer the following values were obtained (double determination):

P, 17.8%, 18.1%; N, 5.6%, 5.6%.

*Example 12*

125 grams of the monoammonium salt of vinylphosphonic acid dissolved in 400 cc. ethanol were placed in the apparatus of Example 9 and polymerized at 80° C. within 2 hours in a manner analogous to that described in Example 9 by adding 3 grams benzoyl peroxide in 100 cc. ethanol. The batch was kept at 80° C. for a further 4 hours, while stirring. The precipitated polymer was suction-filtered and dried in a vacuum drier. 120 grams of a white powdery polymer were obtained. By elementary analysis of the polymer the following values were obtained (double determination):

C, 24.1%, 24.2%; H, 5.0%, 5.1%; P, 22.8%, 23.1%.

*Example 13*

In the apparatus described in Example 9, 60 grams potassium hydroxide were dissolved in 50 cc. ethanol, and 108 grams vinylphosphonic acid in 100 cc. ethanol were added drop by drop at 40–50° C., while stirring and cooling. The mixture was then evaporated to dryness and dissolved again in 700 cc. ethanol. To the solution so obtained 3 grams azo-bis-isobutyronitrile in 100 cc. ethanol were added drop by drop within 1 hour in a manner analogous to that described in Example 9, while stirring and heating under reflux. The batch was kept at reflux temperature for a further 4 hours. The white powdery polymer which had precipitated was suction-filtered and dried in vacuo at 70° C. The yield amounted to 146 grams.

*Example 14*

50 grams vinylphosphonic acid in 100 cc. isopropanol were placed in the apparatus of Example 9, and 50 grams acrylamide in 100 cc. isopropanol and 3 grams azo-bis-isobutyronitrile in 100 cc. isopropanol were added drop by drop within 2 hours at 79° C. in a manner analogous to that described in Example 9 and the whole was stirred for a further 4 hours. The polymer was obtained during the polymerization in the form of a white powder in a quantitive yield.

*Example 15*

80 grams vinylphosphonic acid in 100 cc. dioxan were placed in the apparatus of Example 9, and 10 grams acrylamide in 50 cc. dioxan and 1.5 grams azo-bis-isobutyronitrile in 70 cc. dioxan were added drop by drop within 2 hours at 70–75° C. in a manner analogous to that described in Example 9 and the mixture was kept at 70–75° C. for a further 4 hours, while stirring. The polymer was obtained in the form of a white powder in a quantitive yield. By elementary analysis of the polymer the following values were obtained (double determination):

C, 23.0%, 22.8%; H, 7.2%, 7.0%; P, 7.2%, 7.5%.

*Example 16*

75 grams vinylphosphonic acid in 100 cc. acetone were placed in the apparatus of Example 9, and 25 grams acrylamide and 3 grams azo-bis-isobutyronitrile in 70 cc. acetone were added drop by drop within 2 hours in a manner analogous to that described in Example 9, while heating under reflux. The mixture so obtained was kept at reflux temperature for a further 4 hours, while stirring. The polymer precipitated in the course of the polymerization. The yield amounted to 93 grams. By elementary analysis of the polymer the following values were obtained (double determination):

C, 30.6%, 30.9%; H, 5.5%, 5.3%; P, 23.7%, 24.0%.

*Example 17*

80 grams vinylphosphonic acid in 200 cc. ethylacetate were placed in the apparatus of Example 9, and 20 grams vinylacetate and 1 gram azo-bis-isobutyronitrile in 100 cc. ethylacetate were added drop by drop within 1 hour in a manner analogous to that described in Example 9, while heating under reflux. The mixture so obtained was kept at reflux temperature for a further 4 hours, while stirring. The polymer precipitated in the course of the polymerization in the form of a powder. The yield amounted to 63 grams.

*Example 18*

80 grams vinylphosphonic acid in 200 cc. ethylacetate were placed in the apparatus of Example 9, and 20 grams acrylic acid and 1 gram azo-bis-isobutyronitrile in 100 cc. ethylocetate were added drop by drop within 1 hour at reflux temperature in a manner analogous to that described in Example 9. The mixture so obtained was kept at reflux temperature for a further 4 hours, while stirring. The polymer precipitated in the course of the polymerization. The yield amounted to 91 grams.

*Example 19*

70 grams vinylphosphonic acid in 200 cc. acetonitrile were placed in the apparatus of Example 9, and 30 grams acrylamide and 3 grams azo-bis-isobutyronitrile in 150 cc. acetonitrile were added drop by drop within 1 hour at 70° C. in a manner analogous to that described in Example 9, while stirring. The mixture so obtained was stirred at 70° C. for a further 4 hours and the precipitated polymer was then suction filtered. A solid white polymer was obtained in a quantitive yield.

*Example 20*

20 grams vinylphosphonic acid and 20 grams maleic anhydride in 100 cc. acetic anhydride and 100 cc. benzene were placed in the apparatus of Example 9, and 4 grams azo-bis-isobutyronitrile in 50 cc. acetic anhydride and 50 cc. benzene were added drop by drop within 3 hours at 80° C. in a manner analogous to that described in Example 9, while stirring. The mixture so obtained was stirred at 80° C. for a further 3 hours. The precipitated polymer was isolated and dried. 83 grams of powdery polymer were obtained.

*Example 21*

125 grams of the monoammonium salt of vinylphosphonic acid in 400 cc. ethanol were placed in the apparatus of Example 9, and 10 grams acrylonitrile and 3 grams azo-bis-isobutyronitrile in 100 cc. ethanol were added drop by drop within 1 hour at 80° C. in a manner analogous to that described in Example 9, while stirring. The mixture so obtained was stirred at 80° C. for a further 1½ hours. The polymer precipitated in the course of the polymerization. The yield amounted to 69 grams.

*Example 22*

In the apparatus of Example 9, 23 grams sodium were dissolved in 400 cc. ethanol, and 108 grams vinylphosphonic acid were added drop by drop at 25° C., while stirring and cooling. A further 1600 cc. ethanol and 120 cc. water were then added, the precipitate was dissolved while heating and to the solution so obtained 4 grams azo-bis-isobutyronitrile in 100 cc. ethanol and 50 grams acrylamide in 200 cc. ethanol were added drop by drop within 1 hour at 80° C. in a manner analogous to that described in Example 9, while stirring. The whole was then stirred for a further 3 hours at 80° C. The polymer was obtained in a substantially quantitive yield.

*Example 23*

125 grams of the ammonium salt of vinylphosphoric acid in 400 cc. ethanol were placed in the apparatus of Example 9, and 20 grams methacrylic acid methyl ester and 3 grams azo-bis-isobutylronitrile in 100 cc. ethanol were added drop by drop within 1 hour at 80° C. in a manner analogous to that described in Example 9, while stirring. The mixture so obtained was stirred at 80° C. for a further 2 hours. A powdery polymer precipitated. The yield amounted to 136 grams. By elementary analysis of the polymer the following values were obtained (double determination):

N, 10.6%, 10.8%; P, 22.7%, 23.1%.

*Example 24*

90 grams vinylphosphonic acid in 200 cc. acetic anhydride were placed in the apparatus of Example 9, and 10 grams styrene and 3 grams azo-bis-isobutyronitrile in 100 cc. acetic anhydride were added drop by drop within 1 hour at 80° C. in a manner analogous to that described in Example 9, while stirring. The mixture so obtained was stirred at 80° C. for a further 2 hours. 66 grams of precipitated polymer were obtained.

*Example 25*

80 grams vinylphosphonic acid in 300 cc. ethylacetate were placed in the apparatus of Example 9. While stirring, heating under reflux and introducing nitrogen, 2 grams azo-bis-isobutyronitrile in 50 cc. ethylacetate were added at a time, then 20 grams 1,2-propyleneglycol-monoacrylate in 100 cc. ethylacetate were added drop by drop within 1 hour and the whole was stirred at 80° C. for a further 3 hours. 99 grams of precipitated polymer were obtained. By elementary analysis of the polymer the following values were obtained (double determination):

P, 20.6%, 20.6%; S, 2.4%, 2.3%.

*Example 26*

100 grams vinylphosphonic acid and 30 grams vinylphosphonic acid bis-ethylene-imide in 250 cc. ethylacetate and 125 cc. ethanol were placed in the apparatus of Example 9, and 3 grams azo-bis-isobutyronitrile in 100 cc. ethylacetate and 50 cc. ethanol were added drop by drop within 2 hours at 79° C. in a manner analogous to that described in Example 9, while stirring. The mixture so obtained was stirred at 79° C. for a further 3 hours. 125 grams of precipitated polymer were obtained. By elementary analysis of the polymer the following value was obtained (double determination):

P, 21.7%, 21.7%.

*Example 27*

In the apparatus of Example 9, 100 grams vinylphosphonic acid 200 grams allylglycidyl ether and 5 grams azo-bis-isobutyronitrile were dissolved in 250 cc. ethylacetate and the whole was kept for 2.5 hours at 79–80° C. under a nitrogen atmosphere. 115 grams of precipitated polymer were obtained.

*Example 28*

1600 grams vinylphosphonic acid and 16 grams ethylenglycol dimethacrylate in 1600 cc. ethylacetate were placed in the apparatus of Example 9, and 24 grams azo-bis-isobutyronitrile in 1600 cc. ethylacetate were added drop by drop within 3 hours at 79° C. in a manner analogous to that described in Example 9, while stirring, and the mixture was kept for a further 5 hours at 79° C., while stirring. 1562 grams of precipitated polymer were obtained. The polymer had precipitated in a powdery form and was water-soluble.

*Example 29*

100 grams vinylphosphonic acid in 200 cc. ethylacetate were placed in the apparatus of Example 9. While stirring, heating under reflux and introducing nitrogen, 2 grams azo-bis-isobutyronitrile in 50 cc. ethylacetate were added at a time, then 20 grams acrylamidomethylenediethylamine in 50 cc. ethylacetate were added drop by drop within 1 hour, and the whole was kept for a further 3 hours at reflux temperature, while stirring. The polymer precipitated in the course of the polymerization. The yield amounted to 120 grams.

*Example 30*

100 grams vinylphosphonic acid and 25 grams bis-β-chlorethyl-vinyl-phosphenate in 250 cc. ethylacetate were placed in the apparatus of Example 9. While stirring, heating under reflux and introducing nitrogen, 3 grams azo-bis-isobutyronitrile in 25 cc. ethylacetate were added at a time and the mixture was kept at reflux temperature for a further 5 hours, while stirring. 107 grams of precipitated polymer were obtained.

*Example 31*

125 grams of the monoammonium salt of vinylphosphonic acid in 400 cc. ethanol were placed in the apparatus of Example 9, and 10 grams acrylonitrile and 3 grams azo-bis-isobutyronitrile in 100 cc. ethanol were added drop by drop within 1 hour at 80° C. in a manner analogous to that described in Example 9, while stirring. The mixture so obtained was kept at 80° C. for a further 1½ hours, while stirring. 69 grams of precipitated polymer was obtained.

*Example 32*

125 grams of the monoammonium salt of vinylphosphonic acid, 20 grams vinyl chloride and 3 grams azo-bis-isobutyronitrile in 500 cc. ethanol were kept for 3 hours at 80° C. in an autoclave provided with stirrer, the pressure dropping from an initial 5 atmospheres to 1 atmosphere. 117 grams of precipitated polymer were obtained.

*Example 33*

In the apparatus of Example 9, 71 grams of the diammonium salt of vinylphosphonic acid and 62 grams vinylphosphonic acid were dissolved together with 25 grams of the sodium salt of vinylphosphonic acid in 900 cc. ethanol, while heating. In a manner analogous to that described in Example 9, 3 grams azo-bis-isobutyronitrile in 170 cc. ethanol were added drop by drop, while stirring, heating under reflux and introducing nitrogen, and the mixture so obtained was kept at reflux temperature for a further 2 hours, while stirring. The polymer precipitated in the form of a white powder. The yield amounted to 152 grams.

*Example 34*

125 grams of the monoammonium salt of vinylphosphonic acid, 20 grams propylene and 3 grams azo-bis-isobutyronitrile in 600 cc. ethanol were kept at 80° C. for 3 hours in an autoclave provided with stirrer, the pressure dropping from an initial 4 atmospheres to 1.5 atmospheres. The polymer precipitated in the form of a white powder. The yield amounted to 130 grams.

We claim:

1. The method of making a phosphorus-containing polymer which comprises polymerizing a phosphorus-containing monomer selected from the group consisting of vinyl phosphonic acid, its monoammonium, monoamine, and monoalkali metal salts, and mixtures thereof, at a temperature of from 10° C. to 150° C. in the presence of a free radical polymerization catalyst, said monomer being dissolved in an unpolymerizable organic liquid selected from the group consisting of ethyl acetate, butyl acetate, propyl butyrate, acetic acid, formic acid, and acetic anhydride, said organic liquid being a non-solvent for the polymer produced.

2. The method as in claim 1, wherein said free radical polymerization catalyst is added gradually to said monomer.

3. The method as in claim 1 wherein said temperature is from 50° C. to 100° C.

4. The method as in claim 1 wherein said free radical polymerization catalyst is present in an amount of from 0.1 to 6 percent by weight of said monomer.

5. The method as in claim 1 wherein said monomer is vinylphosphonic acid.

6. The method as in claim 1 wherein said monomer is the monoammonium salt of vinylphosphonic acid.

7. The method as in claim 1 wherein said monomer is the monopotassium salt of vinylphosphonic acid.

References Cited by the Examiner

UNITED STATES PATENTS

| 2,784,169 | 3/1957 | Slocombe | 260—30.6 |
| 3,085,995 | 4/1963 | Kenney | 260—80 |

FOREIGN PATENTS

| 1,023,033 | 1/1958 | Germany. |
| 1,135,176 | 8/1962 | Germany. |
| 812,983 | 5/1959 | Great Britain. |

OTHER REFERENCES

Araus et al.: Chemical Society Journal, 1956, pp. 4607–4612; p. 4607 relied on.

JOSEPH L. SCHOFER, *Primary Examiner.*

L. WOLF, *Assistant Examiner.*